United States Patent [19]
Anderson et al.

[11] 3,904,238
[45] Sept. 9, 1975

[54] SUPPORT FOR MOTORCYCLE FAIRING

[76] Inventors: H. Dwight Anderson, 2624 W. River Rd., Minneapolis, Minn. 55406; David L. Travis, Star Rt., Box 481, Loveland, Colo. 80537

[22] Filed: Feb. 15, 1974

[21] Appl. No.: 443,017

[52] U.S. Cl. .............................. 296/78.1; 280/289
[51] Int. Cl.² ............................................ B62J 17/04
[58] Field of Search.......... D12/114, 118, 126, 182; 248/226 R, 226 D, 229; 280/289; 296/78.1, 84 R, 84 A

[56] References Cited
UNITED STATES PATENTS

| 3,399,855 | 9/1968 | Shirai | 280/289 |
| 3,716,975 | 2/1973 | Smith | 296/78.1 |
| 3,801,152 | 4/1974 | Tims et al. | 296/78.1 |

FOREIGN PATENTS OR APPLICATIONS

| 149,888 | 8/1948 | Australia | 296/78.1 |
| 702,830 | 1/1954 | United Kingdom | 296/78.1 |
| 689,793 | 4/1953 | United Kingdom | 296/78.1 |
| 1,100,424 | 9/1955 | France | 296/78.1 |
| 154,158 | 9/1938 | Germany | D12/182 |
| 208,276 | 4/1940 | Switzerland | 296/78.1 |

*Primary Examiner*—Roy D. Frazier
*Assistant Examiner*—Lawrence J. Staab
*Attorney, Agent, or Firm*—Dugger, Johnson & Westman

[57] ABSTRACT

A simplified support for a motorcycle fairing or shield comprising two rods threaded into existing threaded openings for cap screws of the conventional clamp for the motorcycle handlebars to provide a sturdy, attractive, and very simple support without the need for separate clamping members on the handlebars.

4 Claims, 3 Drawing Figures

PATENTED SEP 9 1975   3,904,238

3,904,238

SUPPORT FOR MOTORCYCLE FAIRING

BACKGROUND OF THE INVENTION

1. Field of the Invention.

The present invention relates to simplified supports for supporting fairings or windshields on the motorcycles.

2. Prior Art.

In the prior art it is common to support motorcycle fairings with separate clamps attached to the handlebars, or by use of clips that are attached at some other location on the motorcycle. These separate clamps are generally unattractive, and are not always sturdy enough to provide a steady, secure mount for a fairing, particularly when the motorcycle is being used at high speeds. Extra parts such as separate clamps also can become loose unless carefully tightened, and many times they are positioned so that they can be in the way of the operator.

SUMMARY OF THE INVENTION

The present invention relates to the provision of main support rods for motorcycle fairings or windshields which use two existing mounting openings of the handlebar clamps of conventional motorcycles, with at least two separate support rods threaded into place in place of the normal cap screws used for tightening the clamps. A tightening nut is threaded onto the support rods for tightening the handlebar clamps as well as locking and holding the rods securely. The rods are bent into a configuration extending forwardly and upwardly and each of them is separately attached to the motorcycle fairing. The rods provide attractive, low cost, easily installed and very secure supports for the fairing.

The attachment of the fairing to the main support rods as disclosed herein also comprises screws that are threaded directly into drilled, tapped openings on the rods for a very secure attachment of the fairing to the support rods.

Thus, the installation combination provides a very sturdy, low cost, and attractive support for the fairings used on motorcycles. Additional clips can be used for supporting the lower portions of the fairings in a normal manner. The fairing disclosed herein is a transparent fairing, made in one piece out of suitable plastic material that is molded to the configuration necessary for the motorcycle, and which is adequately and properly supported on the two support rods that are used in place of cap screws that normally clamp the motorcycle handlebars.

DESCRIPTION OF THE PREFERRED EMBODIMENT

Figure 1:
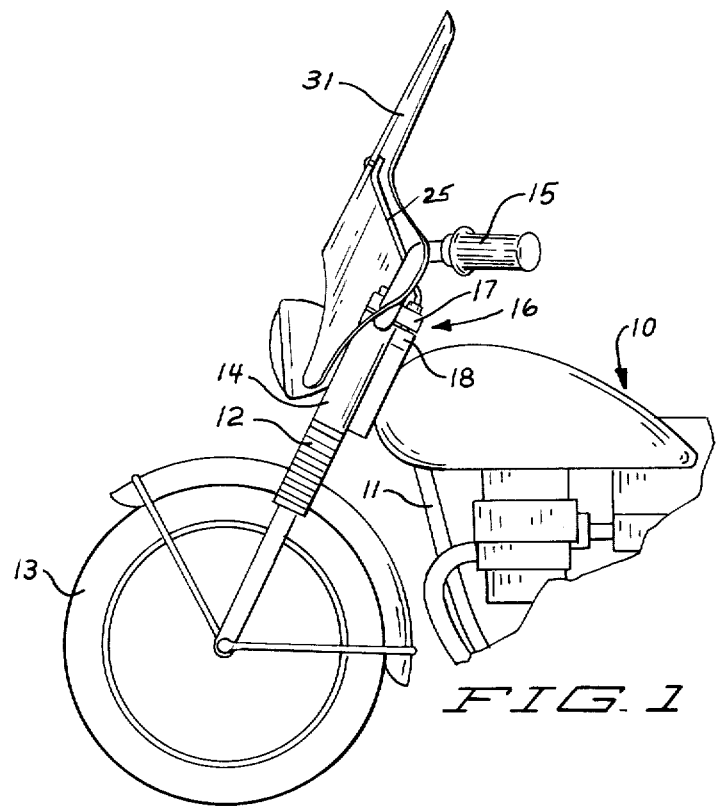
FIG. 1 is a side elevational view of a forward portion of a motorcycle showing a fairing installed on support rods made according to the present invention.

A motorcycle illustrated generally at 10 includes a frame 11, which supports a front fork 12, and the fork has a front wheel 13 attached thereto. The motorcycle is powered in the usual manner, and the fork 12 is mounted in a mounting pivot housing 14. Handlebars 15 are connected to the fork in the usual manner for steering. The support for the handlebars 15 includes a clamp 16 that has two portions that are clamped together. The lower portion 18 of the clamp 16 is clamped and attached to the fork in a known manner, and the upper portion 17 of the clamp 16 is separable from the lower portion 18 of the clamp 16. The upper portion 17 is normally held in place with suitable cap screws that pass through openings in the upper portion 17 and are threadably mounted in tapped holes in the lower portion 18. The handlebars 15 pass between the upper and lower portions and thus are clamped in provided recesses between the upper and lower portions. Conventional cap screws illustrated generally at 20 at the forward end of the clamp are shown in place.

Figures 2, 3:
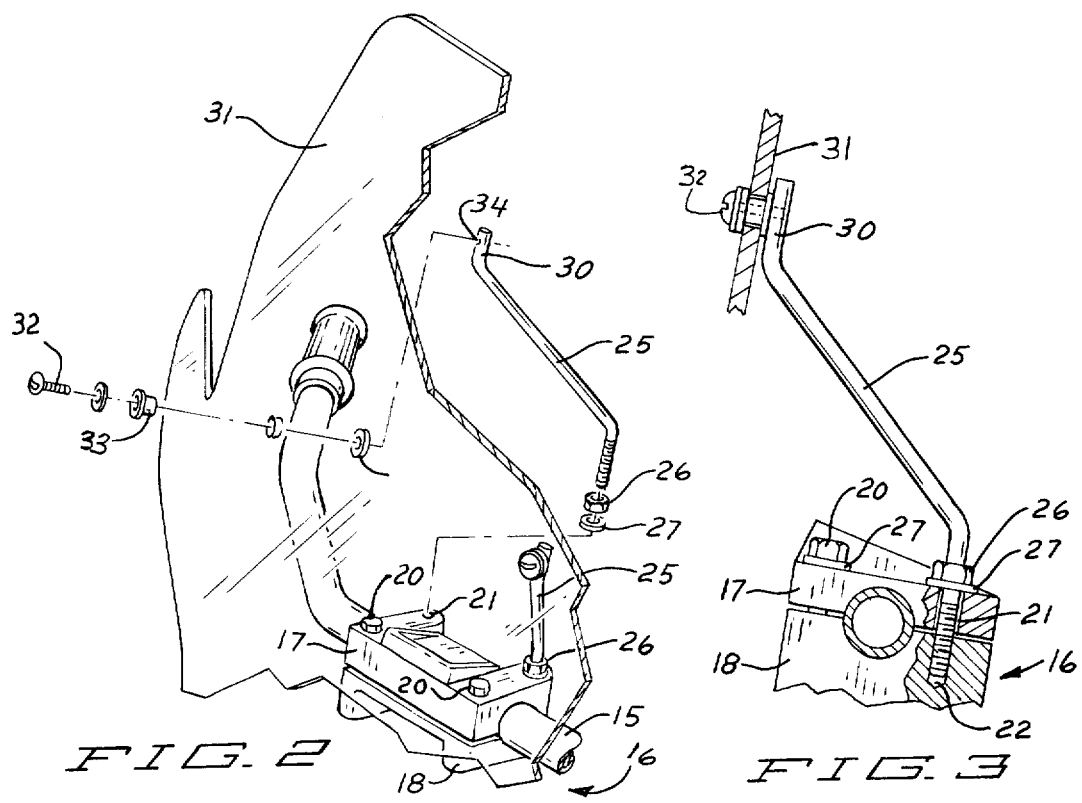
FIG. 2 is a perspective view of the forward portion of a motorcycle showing the installation of two support rods on a conventional motorcycle handlebar clamp, and showing one of the support rods in an exploded view for illustrative purposes.
FIG. 3 is a side elevational view of a support rod and handlebar clamp with parts in section and parts broken away.

At the rear end of the upper clamp portion 17 there are openings 21,21, and in the lower clamp portion 18 (refer to FIG. 3) there are aligning threaded openings 22. In each of the openings 21 there is a support rod 25 mounted therethrough, and the lower ends of the support rods are threaded into the respective openings 22 as shown in FIG. 3. When the rods 25 have been threaded into the openings 22 by turning the rods a sufficient distance, nuts 26 are tightened down against washers 27 on the upper surface of the upper portion 17, and the nuts then serve to clamp the handlebars 15 in the same manner as the conventional cap screws do. However, the rods 25, as can be seen, extend forwardly and upwardly and have upright extending end portions 30 that support a fairing 31. The fairing 31 is held in place with suitable cap screws 32 passing through bushings 33, and using suitable washers as desired. The cap screws 32 are then threaded into the provided openings 34 in the upper end portions 31 of the support rods 25.

The lower portions of the fairing can be held with suitable clips going onto conventional brackets.

The fairing thus is readily installed using at least two conventional cap screw openings normally used for clamping the handlebars on motorcycles. The two support rods are threaded in place, and are spaced apart for stability. The fairing is attached to the support rods with cap screws threaded into the ends of the support rods. While a four bolt handlebar clamp is shown for the handlebars 15 in the present disclosure, there generally are at least two such cap screws for clamping the handlebars in place. At least two cap screws are removed from the conventional handlebars and the support rods 25 threaded in place of them, with the nuts 26 threaded up above the top portion of the clamp so that once the rods 25 are threaded to the lower portion 18 in the threaded openings 22, the nuts 26 can be tightened down against lock washers or otherwise locked in place to securely fasten the handlebars 15. The nuts also hold the support rods securely. Therefore no additional clamp members are necessary on the handlebars for supporting a fairing thereby reducing the clutter on the handlebars, leaving adequate room for attachment of mirrors without any fear of interfering with any of the controls that are normally mounted on the handlebars of motorcycles.

The length of the support rods, and the amount of bend of each of the portions of the support rods can be changed of course to fit different types of motorcycles.

What is claimed is:

1. In a motorcycle having handlebars and clamp means for said handlebars comprising two portions and at least two threaded openings in one of said two portions with axially aligning openings in the other portion, the improvement comprising a pair of elongated threaded rod members threaded in said openings of said one portion and passing through the openings of the other portion respectively, a pair of tightenable nuts threaded on said rod members to engage said other portion for clamping said portions of said clamp means together to clamp said handlebars subsequent to threading the rod members into the threaded openings, said rod members including unitary portions formed to protrude upwardly and forwardly from said clamp means, and a fairing mounted on the outwardly extending portions of said rod members.

2. The combination as specified in claim 1 wherein said rod members include unitary end portions bent to be parallel to contiguous portions of said fairing installed thereon, and cap screw means threadably mounted to said unitary end portions and passing through said fairing to hold said fairing in place against said end portions.

3. The combination as specified in claim 1 wherein said rod members extend laterally outwardly from each other from the clamp means for said handlebars.

4. The combination as specified in claim 1 wherein said clamp means comprise two portions held together with four cap screws in normal installation, and wherein two of said cap screws are replaced by said rod members for supporting said fairing.

* * * * *